United States Patent
Fujita et al.

(10) Patent No.: US 7,641,375 B2
(45) Date of Patent: Jan. 5, 2010

(54) SPREAD ILLUMINATING APPARATUS

(75) Inventors: Hirotaka Fujita, Kitasaku-gun (JP); Takahiro Shimura, Kitasaku-gun (JP); Naoyuki Terada, Kitasaku-gun (JP)

(73) Assignee: Minebea Co., Ltd, Kitasaku-gun (JP)

( * ) Notice: Subject to any disclaimer, the term of this patent is extended or adjusted under 35 U.S.C. 154(b) by 62 days.

(21) Appl. No.: 12/071,140

(22) Filed: Feb. 15, 2008

(65) Prior Publication Data
US 2008/0266881 A1 Oct. 30, 2008

(30) Foreign Application Priority Data
Apr. 27, 2007 (JP) ............... 2007-118926

(51) Int. Cl.
*F21V 7/04* (2006.01)
(52) U.S. Cl. .............. 362/617; 362/327; 362/623; 349/65
(58) Field of Classification Search ........... 362/310, 362/327, 609, 617, 623–627; 349/65
See application file for complete search history.

(56) References Cited

U.S. PATENT DOCUMENTS

| | | | | |
|---|---|---|---|---|
| 5,613,751 A * | 3/1997 | Parker et al. | ............... | 362/627 |
| 7,360,937 B2 * | 4/2008 | Han et al. | ............... | 362/624 |
| 2008/0266881 A1 * | 10/2008 | Fujita et al. | ............... | 362/310 |
| 2008/0316769 A1 * | 12/2008 | Terada et al. | ............... | 362/617 |
| 2009/0040785 A1 * | 2/2009 | Shimura et al. | ............... | 362/609 |

FOREIGN PATENT DOCUMENTS

| JP | A-9-506837 | 7/1997 |
|---|---|---|
| JP | A-2005-302485 | 10/2005 |
| JP | A-2006-285171 | 10/2006 |

\* cited by examiner

*Primary Examiner*—Stephen F Husar
(74) *Attorney, Agent, or Firm*—Oliff & Berridge, PLC

(57) ABSTRACT

A spread illuminating apparatus of side light type includes a transparent resin plate, a reflector disposed at one major surface of the transparent resin plate, and a light source disposed in a light source space formed toward one end of the transparent resin plate, wherein the reflector includes a main part having a rectangular shape and fold parts formed at peripheral edges of the main part so as to rise up therefrom, slits are formed through portions of the transparent resin plate located inside and off its peripheral edges, and wherein the fold parts of the reflector are inserted though the slits of the transparent resin plate.

6 Claims, 5 Drawing Sheets

FIG. 5
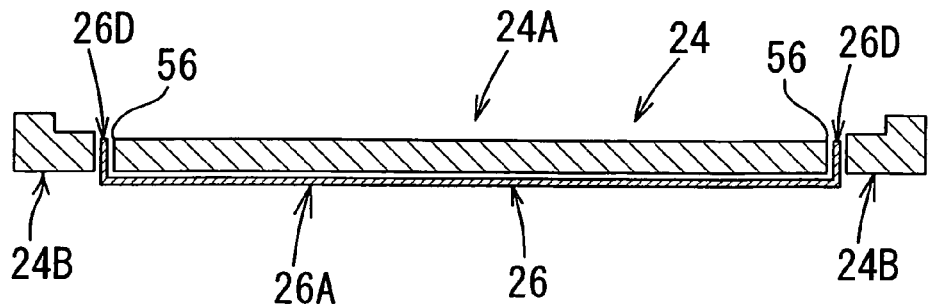
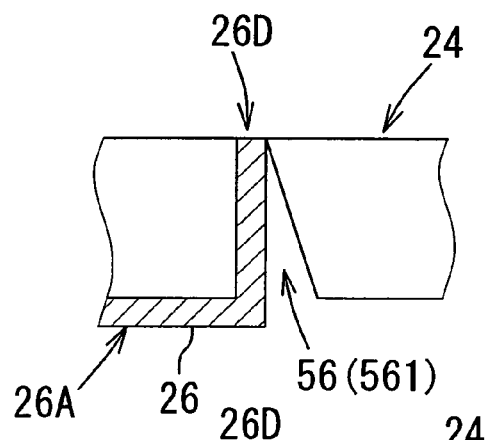
FIG. 6A
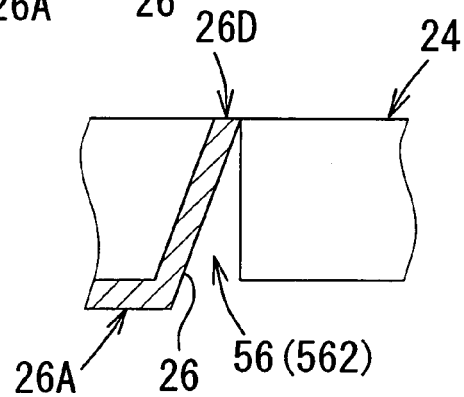
FIG. 6B
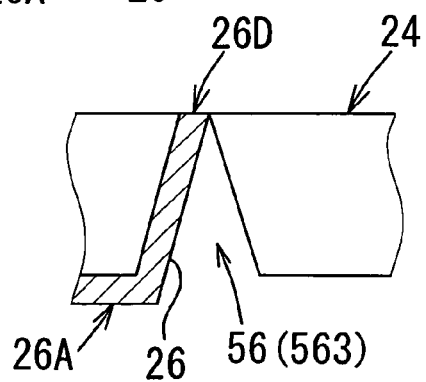
FIG. 6C

SPREAD ILLUMINATING APPARATUS

BACKGROUND OF THE INVENTION

1. Field of the Invention

The present invention relates to a spread illuminating apparatus of side light type, and particularly to a spread illuminating apparatus having a light conductor plate integrated with a housing frame.

2. Description of the Related Art

A liquid crystal display (LCD) device is small in profile, volume and weight, and therefore is extensively used in many kinds of electronic devices, such as a mobile telephone and a personal computer. Since a liquid crystal (LC) of the LCD device does not emit light by itself, an illuminating apparatus as lighting means to illuminate the liquid crystal is required when the LCD device is used in the dark environment where the sunlight or room light is not available. Also, since the LCD device, while increasingly downsized, is requested to have an enlarged screen size, it is required that the illuminating apparatus be reduced in size and also power consumption.

In order to reduce the size and power consumption of the illuminating apparatus, a point light source such as a light emitting diode (LED) is used as a light source of the illuminating apparatus, and the light source, light conductor plate and other constituent members of the illuminating apparatus are optimally arranged for an efficient utilization of light emitted from the light source.

For example, a spread illuminating apparatus of side light type shown in FIG. 7 includes LEDs 2 to emit light, a light conductor plate 1 having a rectangular shape and adapted to receive the light from the LEDs 2 and give out an illuminating light, and a housing frame 7 made of white resin and adapted to house the LEDs 2 and the light conductor plate 1 in place. Projections 12a and 12c are formed at each of side surfaces 11 and 12 of the light conductor plate 1 oriented orthogonal to an end surface 8 thereof having the LEDs 2 while recesses 20a and 20c are formed at each of inner side surfaces of the housing frame 7 oriented in parallel to the side surfaces 11 and 12 of the light conductor plate 1, and the projections 12a and 12c of the light conductor plate 1 engagingly fit respectively in the recesses 20a and 20c of the housing frame 7, whereby the light conductor plate 1 is firmly held in place inside the housing frame 7 (refer, for example, to Japanese Patent Application Laid-Open No. 2005-302485).

In the engagement structure described above, however, a predetermined gap must be provided between the light conductor plate 1 and the housing frame 7, and measures must be taken to compensate for loss of light which is caused by the presence of the gap. Also, since the reflectance ratio of the white resin of the housing frame 7 is smaller than that of a reflector composed of a reflection film, such as enhanced specular reflector (ESR) (refer, for example, to Japanese Patent Application Published No. H9-506837) thus causing loss of light, measures to compensate for such the light loss must also be considered. Further, when the engagement structure is subject to a further reduction in profile, its entire rigidity is lowered, and also the projections 12a and 12c of the light conductor plate 1 are likely to disengage from the recesses 20a and 20c of the housing frame 7.

In order to overcome the light loss, rigidity deterioration and disengagement problems found in the engagement structure of the light conductor plate 1 and the housing frame 7 shown in FIG. 7, an integral structure is proposed, in which, for the purpose of achieving a mechanical strength required for the entire unit while realizing a further profile reduction, a light conductor portion 421 and a housing frame portion 422 are integrated into a single piece as shown in FIG. 8, wherein the light conductor portion 421 includes a patterned area 426 located away from light sources 410 by a predetermined distance (refer, for example, to Japanese Patent Application Laid-Open No. 2006-285171).

In the integral structure shown in FIG. 8, since the housing frame portion 422 is made of the same resin material that is used for the light conductor portion 421 and therefore has a high light transmission rate, lights coming from the light sources 410 pass through the housing frame portion 422 and exit out therefrom. In order to prevent the light from exiting out through the housing frame portion 422, slit-like open spaces 425 to totally reflect the light from the light sources 410 are provided along the interface between the light conductor portion 421 and the housing frame portion 422. However, since polycarbonate or polymethylmethacrylate generally used as a resin material for the integral structure of the light conductor portion 421 with the housing frame portion 422 has a refractive index of around 1.5 thus meaning a relatively large critical angle, there may be a lot of lights that, depending on the structure design, impinge on the slit-like open spaces 425 at an angle smaller than the critical angle, which results in failure to prevent the lights from passing through the housing frame portion 422 and then exiting out.

Under the circumstances described above, if a reflection film is attached to the outer surface of the housing frame portion 422 for the purpose of preventing the lights from exiting out therefrom, the reflection film must be fixed to the housing frame portion 422 by using some appropriate method. For example, if a double stick tape is used for fixation, its adhesive layers undesirably absorb the lights. Even if the reflection film is duly fixed by any other methods than using a double stick tape, the lights are inevitably absorbed while going through the housing frame portion 422.

SUMMARY OF THE INVENTION

The present invention has been made in light of the above problems, and it is an object of the present invention to provide a spread illuminating apparatus of side light type, which has an integral structure of a light conductor portion with a housing frame portion, and which can be successfully downsized such that a necessary mechanical strength is maintained while lights are prevented from exiting out from the housing frame portion thus reducing light loss.

According to an aspect of the present invention, there is provided a spread illuminating apparatus which includes a transparent resin plate, a reflector disposed at one major surface of the transparent resin plate, and a light source disposed in a light source space formed toward one end of the transparent resin plate, wherein the reflector includes a main part having a rectangular shape and fold parts formed at peripheral edges of the main part so as to rise up therefrom, slits are formed through portions of the transparent resin plate located inside and off its peripheral edges, and wherein the fold parts of the reflector are inserted though the slits of the transparent resin plate.

In the aspect of the present invention, the fold parts of the reflector and the slits of the transparent resin plate may be located toward the one end of the transparent plate having the light source space, the other end of the transparent resin plate opposite to the one end having the light source space, and the both sides of the transparent plate orthogonal to the first end having the light source space.

In the aspect of the present invention, the slits of the transparent resin plate may have a larger width at the one major surface than at the other major surface thereof opposite to the one major surface.

In the aspect of the present invention, at least one portion of two walls to define each of the slits of the transparent resin plate may be tilted with respect to a thickness direction of the transparent resin plate.

In the aspect of the present invention, the light source space may be a throughhole located inside and off the peripheral edge of the transparent resin plate.

And, in the aspect of the present invention, at least one of the fold parts of the reflector may be formed separately from the main part.

In the spread illuminating apparatus of side light type, which includes a light conductor plate integrally combined with a housing frame as described above, a necessary mechanical strength is maintained and at the same time lights are prevented from exiting out from the housing frame portion thus reducing light loss while downsizing is successfully achieved.

BRIEF DESCRIPTION OF THE DRAWINGS

FIG. 5 is a cross sectional view of a transparent resin plate of the spread illuminating apparatus of FIG. 1 assembled with the reflector of FIG. 4A;

FIGS. 6A, 6B and 6C are cross sectional views of variation examples of slits each formed in the transparent resin plate of FIG. 5;

DETAILED DESCRIPTION OF THE INVENTION

An exemplary embodiment of the present invention will be described with reference to the accompanying drawings.

Figure 1:
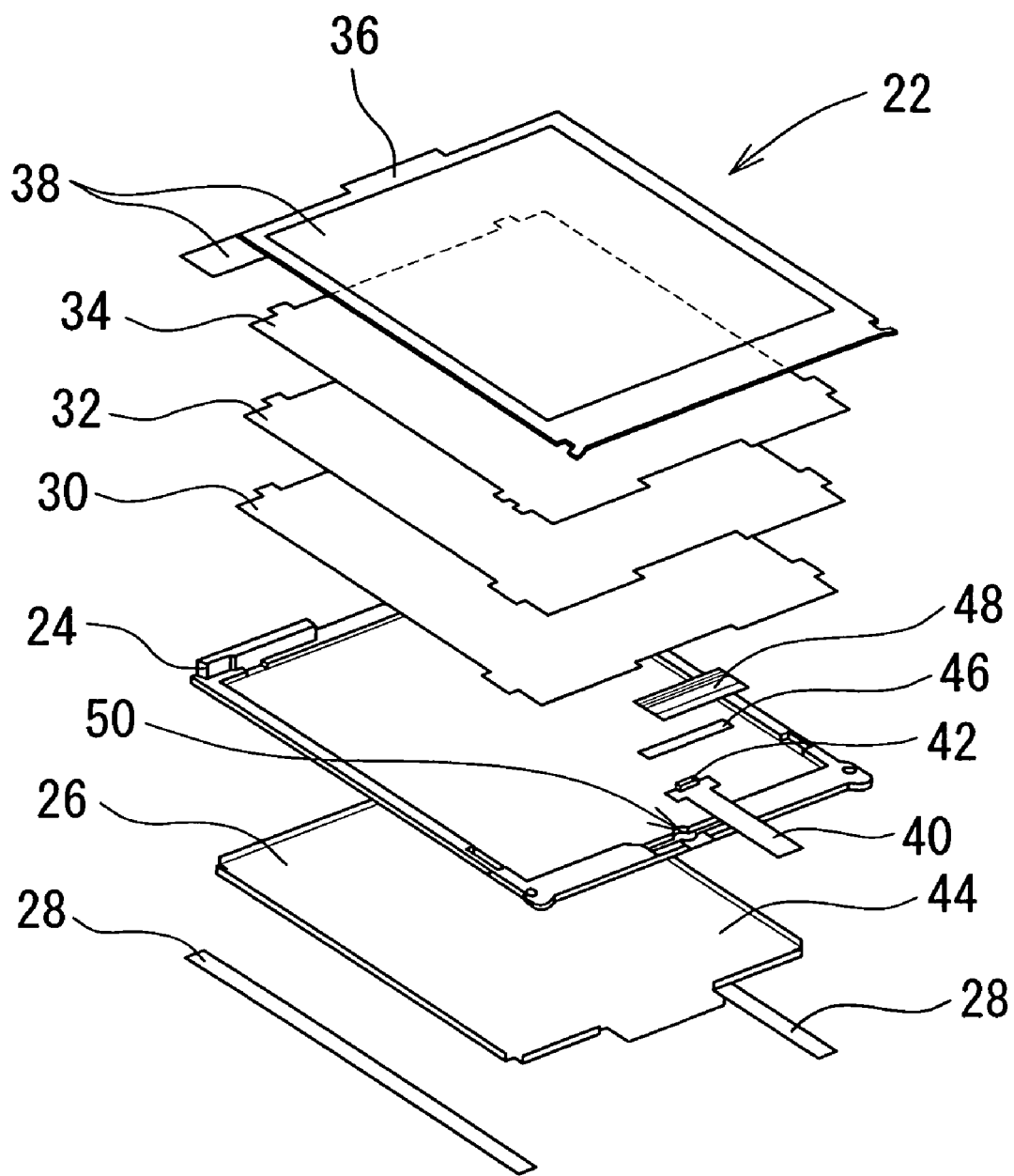
FIG. 1 is a perspective exploded view of a spread illuminating apparatus according to an embodiment of the present invention.
Figure 2:
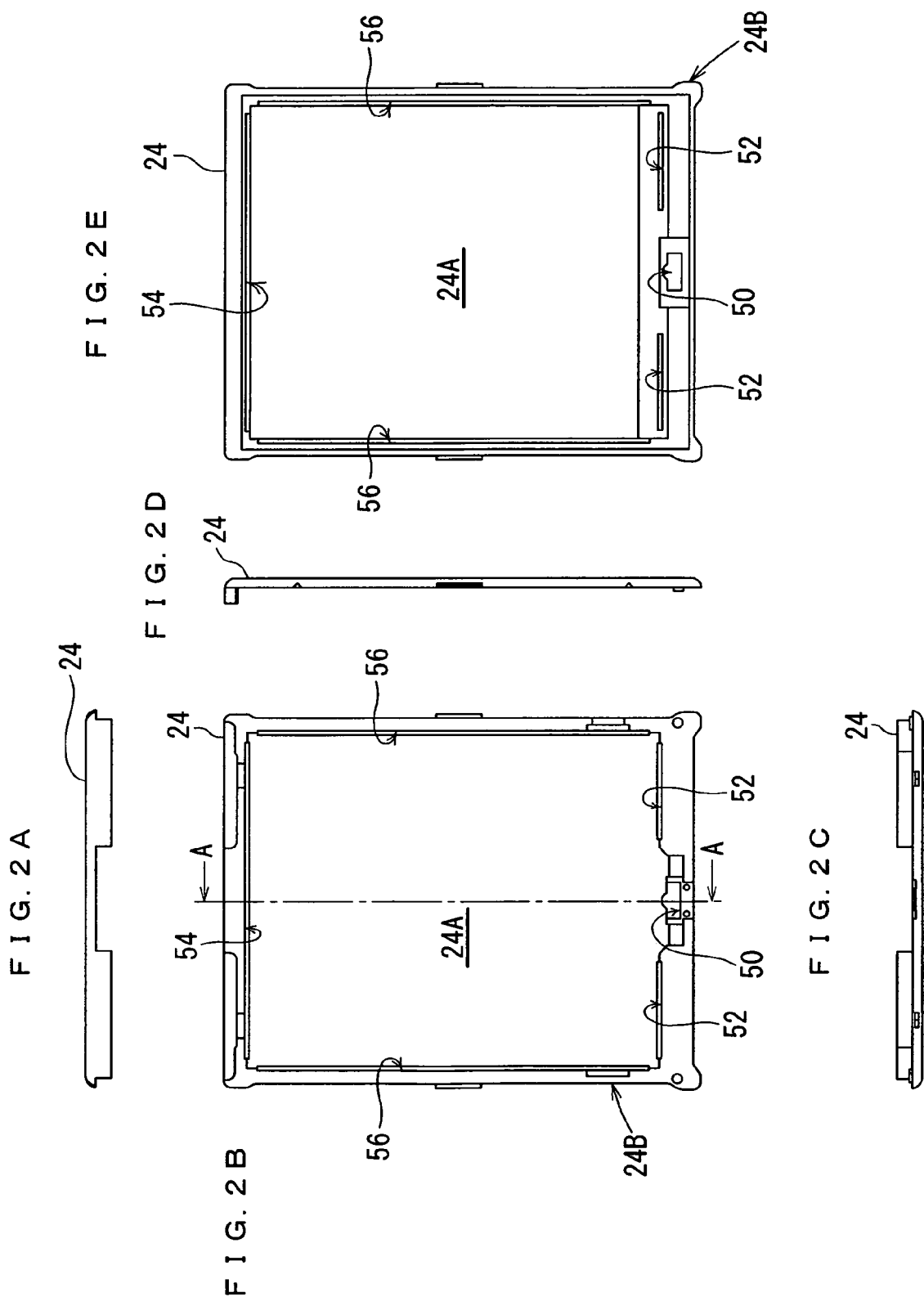
FIG. 2A is a front elevation view of the spread illuminating apparatus of FIG. 1.
FIG. 2B is a top plan view of the same.
FIG. 2C is a rear elevation view of the same.
FIG. 2D is a right side view of the same.
FIG. 2E is a bottom plan view of the same.

Referring to FIG. 1, a spread illuminating apparatus 22 according to an embodiment of the present invention basically includes a light emitting diode (LED) 42 as a light source, a transparent resin plate 24, a reflector 26 fixed to the bottom surface (one major surface) of the transparent resin plate 24 by adhesive tapes 28, a light diffusing sheet 30 disposed at the top surface (the other major surface) of the transparent resin plate 24, then a prism sheet 32, a prism sheet 34, and a light shielding sheet 36 laid on top of another in this order at the top surface side. FIG. 1 further shows a protection film 38 for the light shielding sheet 36, which is for temporal use and is to be removed when a liquid crystal panel is attached on the light shielding sheet 36. The transparent resin plate 24 includes a light source space 50 (to be described later), in which the LED 42 mounted on a flexible printer circuit (FPC) 40 is fitted. The spread illuminating apparatus 22 further includes a light reflecting tape 44 disposed at the bottom of the LED 42, a light reflecting tape 46 disposed at the top of the LED 42, and a black spacer tape 48 disposed on the light reflecting tape 46 for countermeasures against brightness non-uniformity in the vicinity of the LED 42.

Figure 3:
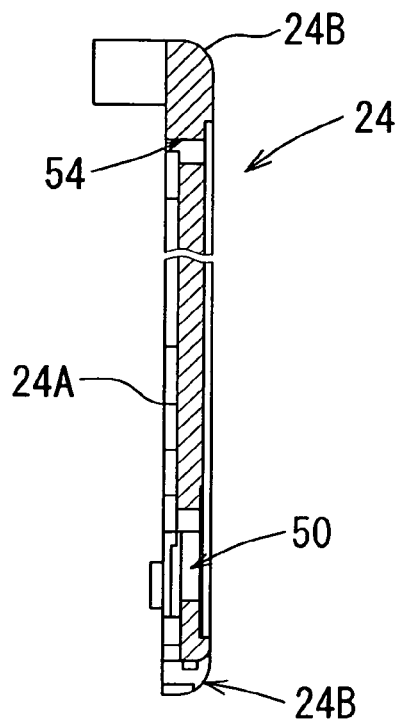
FIG. 3 is a cross sectional view of the spread illuminating apparatus of FIG. 1 taken along a line A-A shown in FIG. 2B.

The transparent resin plate 24 according to the present embodiment is made of polycarbonate or polymethylmethacrylate by a molding process and integrally includes a light conductor portion 24A functioning as a light conductor plate, and a housing frame portion 24B as shown in FIG. 2A to 2E and also FIG. 3. The aforementioned light source space 50 adapted to have the LED 42 firmly fitted therein is constituted by a throughhole which is formed inside and off the peripheral edge of the transparent resin plate 24. Referring to FIG. 3, the transparent resin plate 24 has a step profile in cross section, specifically, has a smaller thickness at the light conductor portion 24A than at the housing frame portion 24B, whereby the reflector 26 sits substantially flush at the bottom surface while the light diffusing sheet 30 and the prism sheets 32 and 34 are duly held flush at the top surface.

Figures 4A, 4B:
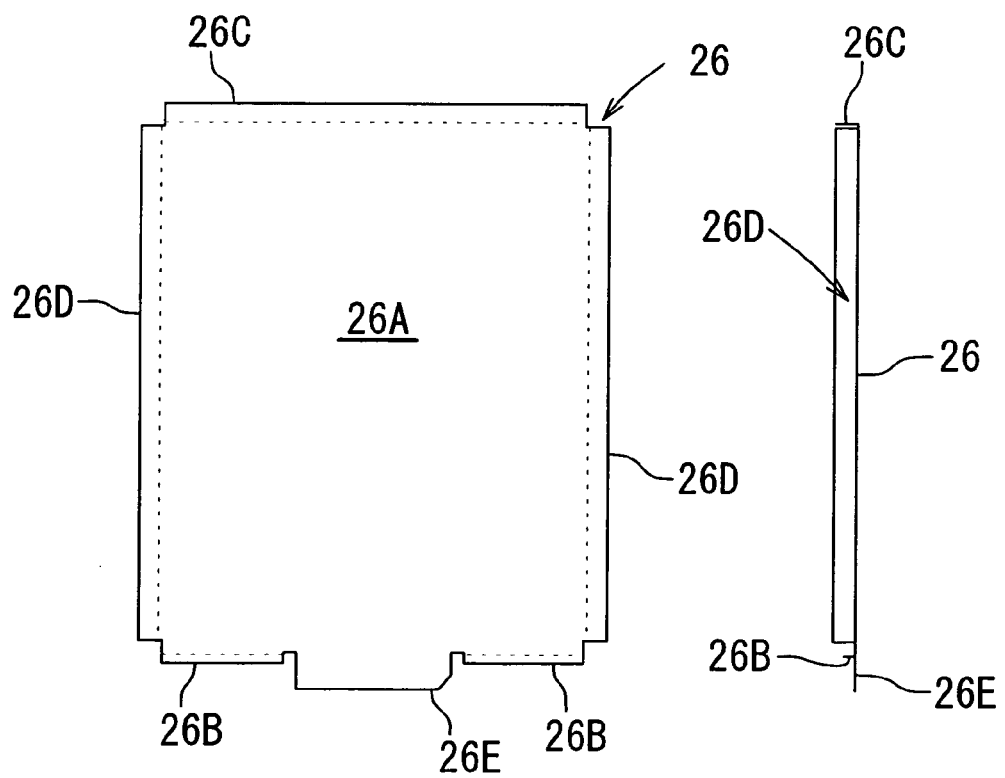
FIG. 4A is a development plan view of a reflector of the spread illuminating apparatus of FIG. 1.
FIG. 4B is a side view of the reflector of FIG. 4A with its rim portions bent up.
Figure 7:
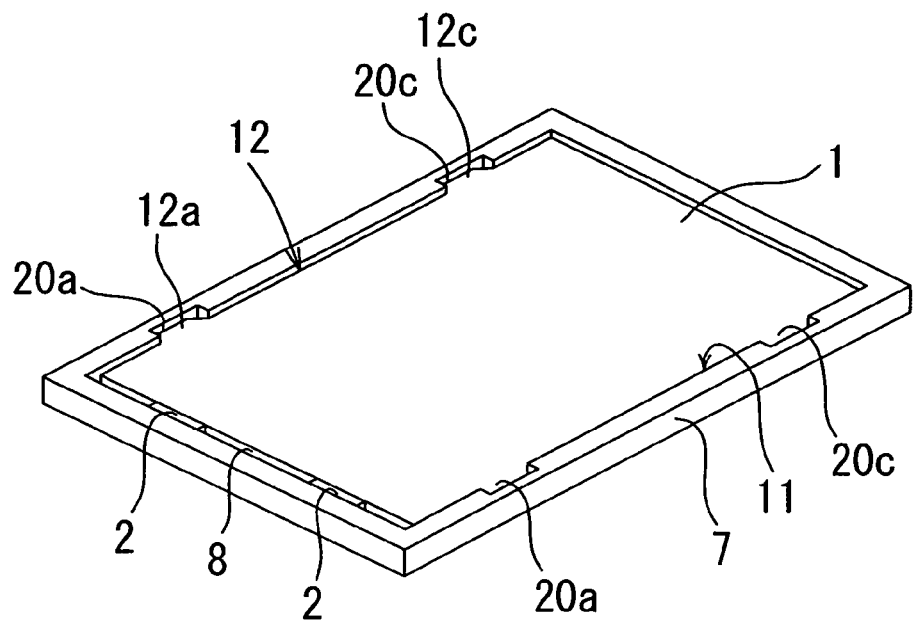
FIG. 7 is a perspective view of a relevant portion of a conventional spread illuminating apparatus in which a light conductor plate is discrete from a housing frame.
Figure 8:
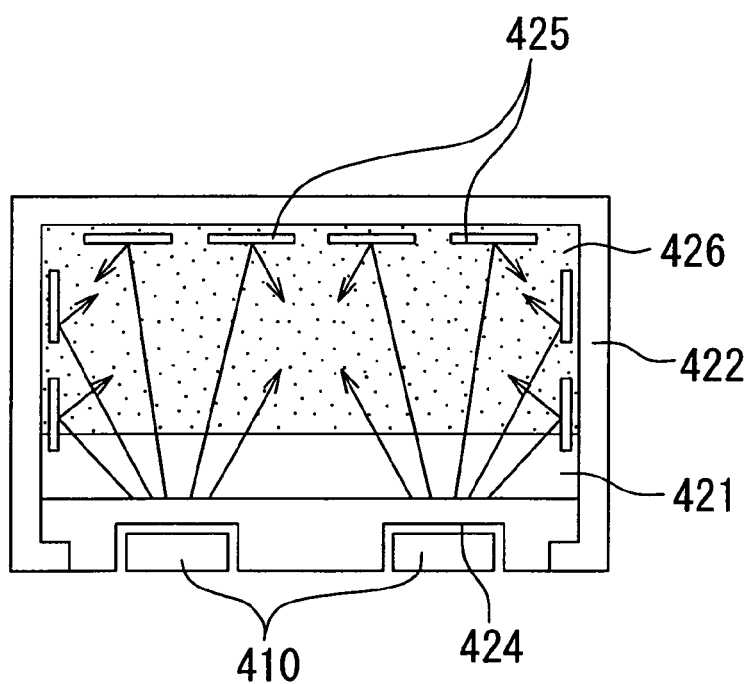
FIG. 8 is a schematic top plan view of a conventional spread illuminating apparatus in which a light conductor plate is integrated with a housing frame.

The reflector 26 described above is an ESR film having a thickness of 0.065 mm. Referring to FIG. 4A, the reflector 26 includes a main part 26A shaped rectangular, and fold parts 26B/26B, 26C and 26D/26D to be bent up at its rims wherein the fold parts 26B/26B are disposed at a rim located toward the light source space 50 of the transparent resin plate 24, the fold part 26C is disposed at a rim opposite to the rim having the fold parts 26B/26B, and the fold parts 26D/26D are formed respectively at rims orthogonal to the rim having the fold parts 26B/26B. Referring back to FIGS. 2B and 2E, slits 52/52, 54 and 56/56 are formed at portions of the transparent resin plate 24 located along and close to its peripheral edges, wherein the slits 52/52, 54 and 56/56 are positioned so as to correspond respectively to the fold parts 26B/26B, 26C and 26D/26D bent up, whereby the fold parts 26B/26B, 26C and 26D/26D bent up can be duly inserted respectively into the slits 52/52, 54 and 56/56 as shown in FIG. 5 (only 26D/26 and 56/56 are shown) thus achieving a fixed attachment. The reflector 26 further includes a projection part 26E formed at the rim having the fold parts 26B/26B so as to extend to cover the bottom of the light source space 50 thus splitting between the two fold parts 26B and 26B.

The slits 52/52, 54 and 56/56 have a uniform width along the depth direction in the example shown in FIG. 5 (only slits 56/56 are shown), but the present invention is not limited to such a slit configuration and the slits 52/52, 54 and 56/56 may have a smaller width at the top of the transparent resin plate 24 than at the bottom thereof as shown in FIGS. 6A, 6B and 6C. In FIG. 6A/6B, either one of two walls to define the slit 56 (561/562) is tilted with respect to the top and bottom surface of the transparent resin plate 24 while the other wall is vertical thereto, and in FIG. 6C, both of two walls to define the slit 56 (563) are tilted in respective opposite directions. In this connection, in case of the examples of FIGS. 6B and 6C, the fold part 26D of the reflector 26 may be originally bent up according to the tilt angle of the tilted wall at the slit 56 (562/563) as shown in FIG. 6B/6C or alternatively may be first bent up at a 90 degree angle to the main part 26A as shown in FIG. 6A and then resiliently deformed to the tilt angle.

The wall at the slit does not have to be entirely tilted in a straight line as shown in FIGS. 6A, 6B and 6C but may be partly tilted, or may be entirely or partly curved, though not shown. Also, the fold parts 26B/26B, 26C and 26D/26D of the reflector 26 as well as the slits 52/52, 54 and 56/56 of the transparent resin plate 24 do not have to be formed in parallel to the peripheral edge lines of the transparent resin plate 24 in top plan view (FIGS. 2B/2E and 3) but may be optimally arranged according to the shape of the LC panel to be illuminated, the brightness distribution, and the like of the spread illuminating apparatus 22. Further, the fold parts 26B/26B, 26C and 26D/26D or the projection part 26E do not have to be formed integrally with the main part 26A as described above but may be formed separately from the main part 26A as appropriate.

The spread illuminating apparatus 22 according to the present embodiment includes only one LED 42 as a light source, but the present invention is not limited to such a light source arrangement but may incorporate two or more of the LEDs 42 with a necessary number of light source spaces 50.

Description will now be made on the advantages of the spread illuminating apparatus 22 according to the present embodiment.

Since the reflector 26 is attached to the bottom of the transparent resin plate 24 such that the fold parts 26B/26B, 26C and 26D/26D of the reflector 26 are inserted respectively in the slits 52/52, 54 and 56/56 of the transparent resin plate 24, the reflector 26 can be reliably and precisely positioned with respect to the transparent resin plate 24. Also, the fold parts 26B/26B, 26C and 26D/26D of the reflector 26 are inserted all the way through the slits 52/52, 54 and 56/56 located inside and substantially all the way along the peripheral edges of the transparent resin plate 24, and therefore are adapted to reflect substantially all the light emitted from the LED 42 and introduced in the light conductor portion 24A of the transparent resin plate 24, whereby the light is prevented from entering the housing frame portion 24B of the transparent resin plate 24 thus securely preventing the light from leaking from every part of the peripheral edge surfaces of the transparent resin plate 24.

When the slits 52/52, 54 and 56/56 are configured to have a smaller width at the top surface of the transparent resin plate 24 than at the bottom surface thereof thus forming a tapering configuration in cross section, the fold parts 26B/26B, 26C and 26D/26D can be inserted into the slits 52/52, 54 and 56/56 without difficulty, and also the tip ends of the folds parts 26B/26B, 26C and 26D/26D are adapted to engage with the slits 52/52, 54 and 56/56 at the top surface of the transparent resin plate 24. Consequently, the productivity is improved, and also the attachment strength is increased. Further, since the fold parts 26B/26B, 26C and 26D/26D are more likely to make a tight contact with the walls of the slits 52/52, 54 and 56/56, the effective reflectance ratio at the fold parts 26B/26B, 26C and 26D/26D can be enhanced.

Since the light source space 50 to house the LED 42 is formed inside and off the peripheral edge of the transparent resin plate 24, the LED 42 is disposed inside and off the peripheral edge of the transparent resin plate 24, and therefore the light emitted from the LED 42 is efficiently introduced into the light conductor portion 24A of the transparent resin plate 24 and can be effectively utilized.

When at least one of the fold parts 26B/26B, 26C and 26D/26D of the reflector 26 is formed separately from the main part 26A, the freedom in selection of production process of the reflector 26 as well as in selection of material thereof can be increased, and the reflection efficiency can be increased in a well balanced manner while the material and production cost can be reduced.

The present inventors made a comparison on central brightness, average brightness and brightness uniformity between the spread illuminating apparatus 22 having the reflector 26 provided with the fold parts 26B/26B, 26C and 26D/26D according to the embodiment of the present invention versus a comparative example of a spread illuminating apparatus having a reflector equivalent to the reflector 22 but without the fold parts 26B/26B, 26C and 26D/26D. The comparison results show that the central brightness, average brightness and brightness uniformity of the spread illuminating apparatus 22 versus the comparative example are: 2501 cd/m$^2$ vs. 1938 cd/m$^2$; 2442 cd/m$^2$ vs. 1862 cd/m$^2$; and 74.4% vs. 57.9%, respectively. Thus, it is verified that light leakage from the outer edge surfaces of the transparent resin plate 24 is effectively prevented in the spread illuminating apparatus 22.

What is claimed is:

1. A spread illuminating apparatus comprising:
    a transparent resin plate which has slits formed through portions of the transparent resin plate, the portions being located inside and off peripheral edges of the transparent resin plate, and which has a light source space formed toward a first end thereof;
    a light source disposed in the light source space of the transparent resin plate; and
    a reflector disposed at a first major surface of the transparent resin plate, the reflector comprises a main part having a rectangular shape and fold parts formed at peripheral edges of the main part so as to rise up therefrom and to be inserted though the slits.

2. A spread illuminating apparatus according to claim 1, wherein the fold parts of the reflector and the slits of the transparent resin plate are located toward the first end of the transparent plate having the light source space, a second end of the transparent resin plate opposite to the first end having the light source space, and both sides of the transparent plate orthogonal to the first end having the light source space.

3. A spread illuminating apparatus according to claim 1, wherein the slits of the transparent resin plate have a larger width at the first major surface than at a second major surface thereof opposite to the first major surface.

4. A spread illuminating apparatus according to claim 1, wherein at least one portion of two walls to define each of the slits of the transparent resin plate is tilted with respect to a thickness direction of the transparent resin plate.

5. A spread illuminating apparatus according to claim 1, wherein the light source space is a throughhole located inside and off the peripheral edge of the transparent resin plate.

6. A spread illuminating apparatus according to claim 1, wherein at least one of the fold parts of the reflector is formed separately from the main part.

* * * * *